(12) United States Patent
Fountain

(10) Patent No.: US 12,209,900 B2
(45) Date of Patent: Jan. 28, 2025

(54) WEIGHT-BASED ITEM DETECTION

(71) Applicant: ZEBRA TECHNOLOGIES CORPORATION, Lincolnshire, IL (US)

(72) Inventor: Mark Thomas Fountain, Hitchin (GB)

(73) Assignee: Zebra Technologies Corporation, Lincolnshire, IL (US)

( * ) Notice: Subject to any disclaimer, the term of this patent is extended or adjusted under 35 U.S.C. 154(b) by 441 days.

(21) Appl. No.: 17/556,651

(22) Filed: Dec. 20, 2021

(65) Prior Publication Data
US 2023/0194331 A1    Jun. 22, 2023

(51) Int. Cl.
*G01G 19/414* (2006.01)
*G01G 19/08* (2006.01)
*G06Q 10/087* (2023.01)

(52) U.S. Cl.
CPC .......... *G01G 19/414* (2013.01); *G01G 19/08* (2013.01); *G06Q 10/087* (2013.01)

(58) Field of Classification Search
CPC ...... G01G 19/414; G01G 19/08; G01G 19/42; G06Q 10/087

USPC ............................................................. 177/1
See application file for complete search history.

(56) References Cited

U.S. PATENT DOCUMENTS

| | | | |
|---|---|---|---|
| 10,262,293 B1 * | 4/2019 | Prater | G06Q 10/087 |
| 10,438,277 B1 * | 10/2019 | Jiang | G06V 40/28 |
| 10,679,181 B1 * | 6/2020 | Prater | G06Q 10/087 |
| 10,810,540 B1 * | 10/2020 | Gopal | G01G 19/42 |
| 10,970,666 B2 * | 4/2021 | Higashida | G06Q 10/0838 |
| 11,436,553 B2 * | 9/2022 | Kirmani | G01G 19/005 |

\* cited by examiner

*Primary Examiner* — Jacques M Saint Surin

(57) ABSTRACT

An example transporter includes: a chassis with a locomotive assembly; a shelf supported on the chassis to receives items; a weight sensing system associated with the shelf, the weight sensing system configured to measure an item weight for an item received on the shelf; a processor interconnected with the weight sensing system, the processor configured to: obtain, from the weight sensing system, the item weight; identify an item identifier for the item based on the item weight; and determine, based on the item identifier, whether the item complies with an expected item to be received at the transporter.

23 Claims, 5 Drawing Sheets

WEIGHT-BASED ITEM DETECTION

BACKGROUND

Facilities such as warehouses may employ autonomous transporters or other mechanized devices to transport items retrieved from shelves by workers in the facilities. Errors in retrieval or placement of the items on the transporters may cause delays and increase costs, however, manual verification by the workers that the correct items are deposited onto the transporters may be costly and time-consuming.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
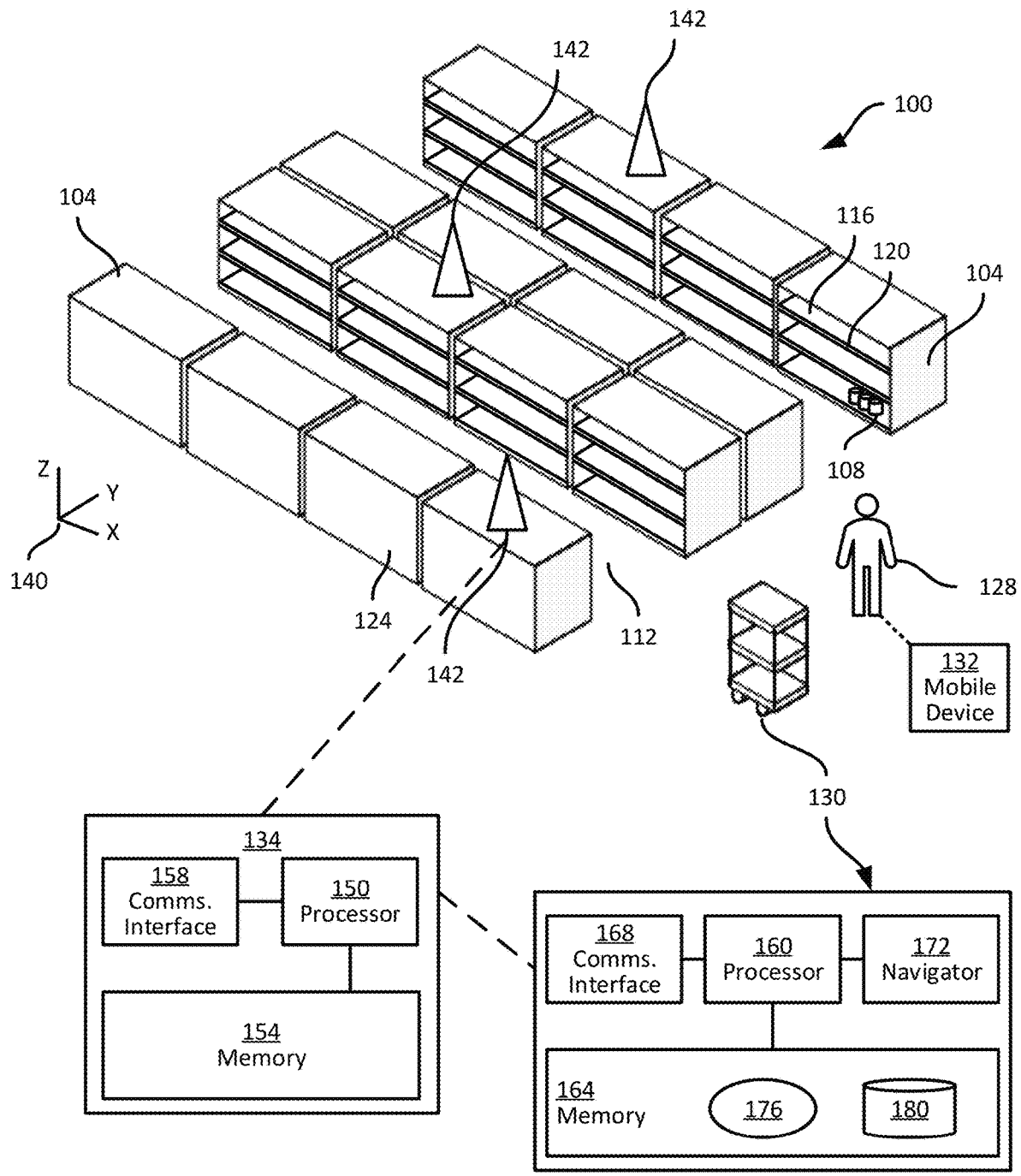
FIG. 1 is a schematic diagram of a system for weight-based item detection deployed in a facility.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a transporter comprising: a chassis with a locomotive assembly; a shelf supported on the chassis to receives items; a weight sensing system associated with the shelf, the weight sensing system configured to measure an item weight for an item received on the shelf; a processor interconnected with the weight sensing system, the processor configured to: obtain, from the weight sensing system, the item weight; identify an item identifier for the item based on the item weight; and determine, based on the item identifier, whether the item complies with an expected item to be received at the transporter.

Additional examples disclosed herein are directed to a method comprising: obtaining, from a weight sensing system of a transporter, an item weight for an item received on a shelf of the transporter; identifying an item identifier for the item based on the item weight; and determining, based on the item identifier, whether the item complies with an expected item to be received at the transporter.

FIG. 1 depicts a system 100 deployed in an interior of a facility, such as a warehouse, a manufacturing facility, or the like. The facility includes a plurality of support structures 104 carrying items 108. In the illustrated example, the support structures 104 include shelf modules, e.g., arranged in sets forming aisles 112. FIG. 1, specifically, illustrates two aisles 112 each formed by eight shelf modules. The facility can have a wide variety of layouts other than the example layout shown in FIG. 1.

The support structures 104 can include shelf modules, pegboards, bins, and the like, to support the items 108 thereon. As shown in FIG. 1, support structures 104 in the form of shelf modules can include support surfaces 116 terminating in shelf edges 120, which face into the corresponding aisle 112. A shelf edge 120, as will be apparent to those of skill in the art, is a surface bounded by adjacent surfaces having different angles of inclination. In the example illustrated in FIG. 1, each shelf edge 120 is at an angle of about ninety degrees relative to the corresponding support surface 116 above that shelf edge 120 and the underside (not shown) of the support surface 116. In other examples, the angles between a shelf edge 120 and adjacent surfaces is more or less than ninety degrees.

The support surfaces 116 are accessible from the aisles 112 into which the shelf edges 120 face. In some examples, each support structure 104 has a back wall 124 rendering the support surfaces 116 inaccessible from the opposite side of the module. In other examples, however, the support structures 104 can be open from both sides (e.g., the back wall 124 can be omitted).

The support surfaces 116 carry the items 108, which can include any of a wide variety of objects, such as products, packages, and the like. The items 108 may be received at the facility and placed on the support structures 104 for storage. Later, the items 108 may be retrieved from the support structures 104, e.g., for consumption in a manufacturing process, for shipment from the facility, or the like.

Retrieval of the items 108 from the support structures 104 can be accomplished by a worker 128, also referred to as a user 128 and a transporter 130. Only one user 128 and one transporter 130 are shown in FIG. 1, but it is contemplated that more users 128 and transporters 130 may be deployed in the facility and may be dependent on the size and/or layout of the facility, the nature of the items 108, and the like. The transporter 130, which may also be referred to as a collaborative robot or "cobot".

Figure 2:
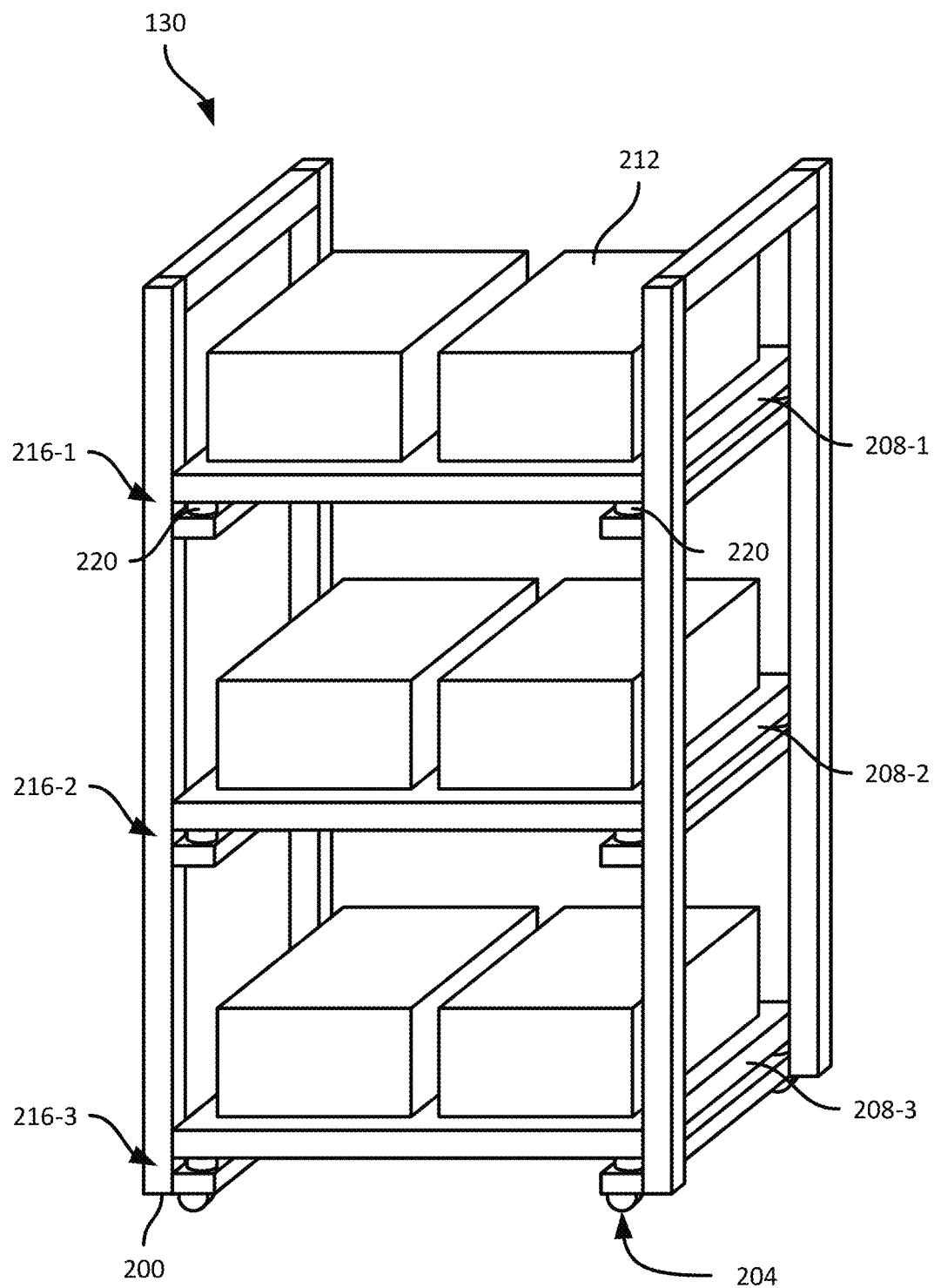
FIG. 2 is a schematic diagram of a transporter in the system of FIG. 1.

For example, referring to FIG. 2, the transporter 130 is illustrated in greater detail. The transporter 130 includes a chassis 200 with a locomotive assembly 204, such as wheels, tracks, or the like driven by an electric motor. The chassis 200 supports at least one shelf 208; in the present example, three shelves 208-1, 208-2, and 208-3 (referred to generically as a shelf 208 and collectively as shelves 208; this nomenclature is also used elsewhere herein) are illustrated. Each shelf 208 may be divided into sections allocated for different sets of items to be transported together (e.g., as a single delivery order or the like). Accordingly, each shelf 208 may support bins 212 defining the different sections, with each bin 212 to collect items for a given order. In other examples, rather than using bins 212, the shelf 208 may simply be divided into sections, e.g., quadrants, and may have visual indicators such as lines or the like to define each section.

Each shelf 208 has a respective weight sensing system 216-1, 216-2, and 216-3 associated with the shelf 208. The weight sensing systems 216 are generally configured to measure an item weight for each item received on the corresponding shelf 208. The weight sensing systems 216 may further be configured to determine an item location for each item received on the corresponding shelf 208 based on the distribution of the item weight on the weight sensing systems 216. Thus, the weight sensing systems 216 include at least a mechanism to measure the item weight, as well as a mechanism to locate the item on the weight sensing systems 216.

For example, each weight sensing system 216 may include four weight sensors 220 at each of the four corners of the corresponding shelf 208. The weight sensors 220 may be any suitable sensors, such as stress gauges, capacitance sensors, piezo crystals, and the like. By including sensors at each of the four corners of the shelf 208, the weight sensing system 216 may determine the item weight by summing the weight detected by each of the weight sensors 220. Additionally, the weight sensing system 216 may determine the item location based on the distribution of weight detected by each of the weight sensors 220. Specifically, the ratios of weights detected by the weight sensors 220 as separated by corresponding x- and y-coordinates may allow a determination of x- and y-coordinates of the center of mass of the item on the shelf 208.

Returning to FIG. 1, to transport an item 108 from a support structure 104, e.g., to ship the item 108 from the facility to another facility, to a customer, or the like, a user 128 may be instructed to travel to the support structure 104 carrying the relevant item 108. The user 128 may then retrieve the relevant item 108 from the support structure 104. Once the item 108 is retrieved, the user 128 places the item 108 onto a transporter 130, for subsequent transport to another portion of the facility, such as a shipping area. In particular, the user 128 may place the item 108 on a particular shelf 208 and into a particular bin 212 in accordance with the corresponding order of the item 108.

As will be apparent, each transporter 130 can be configured to carry a plurality of items 108 simultaneously, such items 108 having been transferred to the transporter 130 from the support structures 104 by various different users 128. In other words, users 128 and transporters 130 are not bound persistently. Instead, a user 128 and a transporter 130 may be associated with one another only for a given task (e.g., to transfer a particular item 108 from a support structure 104 to the transporter 130), and each of the user 128 and the transporter 130 may subsequently be bound with other transporters 130 or users 128 for the completion of other tasks.

In particular, a user 128 in the facility can be equipped with a mobile computing device 132, also referred to simply as a device 132. The device 132 can be a tablet computer, a smart phone, a wearable computer (e.g., smart glasses), a barcode scanner, or the like. The device 132 can implement functionality to assist the user 128 in completing various tasks in the facility. An example of such tasks includes a pick task, in which the user 128 retrieves specific items 108 from support structures 104, e.g., to fill an online order received from a customer of the facility. The pick task can also provide the user 128 with instructions, via the associated device 132, identifying a particular transporter 130 and particular shelves 208 and/or bins 212 to which items 108 retrieved from the support structures 104 are to be deposited.

The functionality implemented by the device 132 in connection with a pick task can include receiving (e.g., from a server 134 or other central computing device) a list of item identifiers to be picked, and/or presenting directional guidance to the user 128 indicating locations of such items 108 in the facility. When a given item 108 is picked from a support structure 104 according to the guidance provided by the device 132, the user 128 may scan a barcode associated with the picked item 108. Scanning of the barcode can provide confirmation that the item 108 has been picked, and thereby enable the device 132 to track progress of the pick task. The device 132 may further communicate the progress of the pick task to the server 134 to track progress of the pick task. The device 132 may therefore include a controller, communication interface, input and output assemblies such as displays, indicator lights, or the like, enabling the devices 132 to receive instructions from the server 134 and send updates to the server 134.

The server 134 can allocate a transporter 130 to a user 128 for a particular pick task, based for example on the location of the device 132 (which is employed as a proxy for the location of the user 128) and the location of the transporter in a coordinate system 140 established in the facility. For example, the system 100 can include a location tracking subsystem enabling periodic retrieval of device 132 and transporter 130 locations by the server 134.

The location tracking subsystem can include for, for example, wireless emitters 142 deployed throughout the facility, such as wireless network access points, beacons (e.g., Bluetooth beacons), radio frequency identification (RFID) readers, and the like. In other examples, the location tracking subsystem can include cameras or other sensors configured to detect the device 132 and/or the transporter 130, e.g., from video streams captured by the cameras. The device 132 and the transporter 130 can be configured to determine their locations in the coordinate system 140 based on the signal strength measurements and/or other parameters determined from signals generated by the emitters 142. The device 132 and the transporter 130 can then report the determined locations to the server 134. In other examples, the emitters 142 can cooperate to determine and report the locations of the transporter 130 and/or the device 132 to the server 134 (e.g., in the case of emitters 142 that include RFID readers). In further examples, the device 132 and/or the transporter 130 can include motion sensors, such as inertial measurement units (IMUs), odometers (in the case of the transporter 130) or the like to assist in determining and reporting locations.

FIG. 1 also illustrates certain internal components of the server 134. The server 134 includes a special-purpose controller, such as a processor 150, interconnected with a non-transitory computer-readable storage medium, such as a memory 154. The memory 154 includes a combination of volatile memory (e.g., Random Access Memory or RAM) and non-volatile memory (e.g., read only memory or ROM, Electrically Erasable Programmable Read Only Memory or EEPROM, flash memory). The processor 150 and the memory 154 each comprise one or more integrated circuits.

The memory 154 stores computer-readable instructions for execution by the processor 150 to allow the server 134 to allocate tasks and provide instructions to the transporter 130 and the device 132. Those skilled in the art will appreciate that the functionality implemented by the processor 150 via execution of the computer-readable instructions stored in the memory 154 may also be implemented by one or more specially designed hardware and firmware components, such as FPGAs, ASICs and the like in other embodiments.

The server 134 also includes a communications interface 158 interconnected with the processor 150. The communications interface 158 includes any suitable hardware (e.g., transmitters, receivers, network interface controllers and the like) allowing the server 134 to communicate with other computing devices (e.g., the device 132 and the transporter 130) via a suitable combination of local and/or wide-area networks. The specific components of the communications interface 158 are selected based on the type(s) of network(s) used by the server 134.

FIG. 1 further illustrates certain internal components of the transporter 130, including a processor 160, a memory 164, a communications interface 168, and a navigator 172.

The processor 160 is interconnected with a non-transitory computer-readable storage medium, such as the memory 164. The memory 164 includes a combination of volatile memory (e.g. Random Access Memory or RAM) and non-volatile memory (e.g. read only memory or ROM, Electrically Erasable Programmable Read Only Memory or EEPROM, flash memory). The processor 160 and the memory 164 may each comprise one or more integrated circuits.

The memory 164 stores computer-readable instructions for execution by the processor 160. In particular, the memory 164 stores an application 176 which, when executed by the processor 160, configures the processor 160 to perform various functions discussed below in greater detail and related to the weight-based item detection of the transporter 130. The application 176 may also be implemented as a suite of distinct applications.

Those skilled in the art will appreciate that the functionality implemented by the processor 160 may also be implemented by one or more specially designed hardware and firmware components, such as a field-programmable gate array (FPGAs), application-specific integrated circuits (ASICs) and the like in other embodiments. In an embodiment, the processor 160 may be, respectively, a special purpose processor which may be implemented via dedicated logic circuitry of an ASIC, an FPGA, or the like in order to enhance the processing speed of the operations discussed herein.

The memory 164 also stores a repository 180 storing rules and data for the weight-based item detection operation. For example, the repository 180 may store item weights, current items and/or item lists for each of the shelves 208 and/or bins 212, an aggregate weight for the transporter 130, and the like.

The transporter 130 also includes a communications interface 168 enabling the transporter 130 to exchange data with other computing devices such as the server 134. The communications interface 168 is interconnected with the processor 160 and includes suitable hardware (e.g., transmitters, receivers, network interface controllers and the like) allowing the transporter 130 to communicate with other computing devices—such as the server 134. The specific components of the communications interface 168 are selected based on the type of network or other links that the transporter 130 communicates over. The transporter 130 can be configured, for example, to communicate with the server 134 using the communications interface 168 to receive instructions and send item data to the server 134. For example, the transporter 130 may receive, from the server 134, a list of items to be received and transported by the transporter 130. Additionally, the list of items may be sorted by bins 212, such that each bin 212 has a corresponding list of items which are to be placed in the bin 212.

The transporter 130 may further include one or more input and/or output devices (not shown). The input devices may include one or more buttons, keypads, touch-sensitive display screens or the like for receiving input from an operator. The output devices may further include one or more display screens, sound generators, vibrators, or the like for providing output or feedback to an operator.

The transporter 130 may further include the navigator 172 configured to enable autonomous or semi-autonomous navigation of the transporter 130 within the facility. Thus, the navigator 172 may include various sensors, cameras, controllers and the like to enable the transporter 130 to detect its environment, including obstacles, and the like, and to control the locomotive assembly 204 to navigate about the facility. Thus, the transporter 130 may also be assigned to a pick task, which may include receiving, from the server 134 or other central computing device, navigational instructions to move to a location at or near one or more of the items 108 on the item list for the transporter 130. For example, the navigational instructions may instruct the transporter 130 to move to within a threshold distance from a particular item 108 to facilitate transferal of the item 108 from the support structure 104 to the transporter 130 by the user 128. Accordingly, in some examples, the navigational instructions may be associated with a target item 108 or items 108 to be received by the transporter 130.

Figure 3:
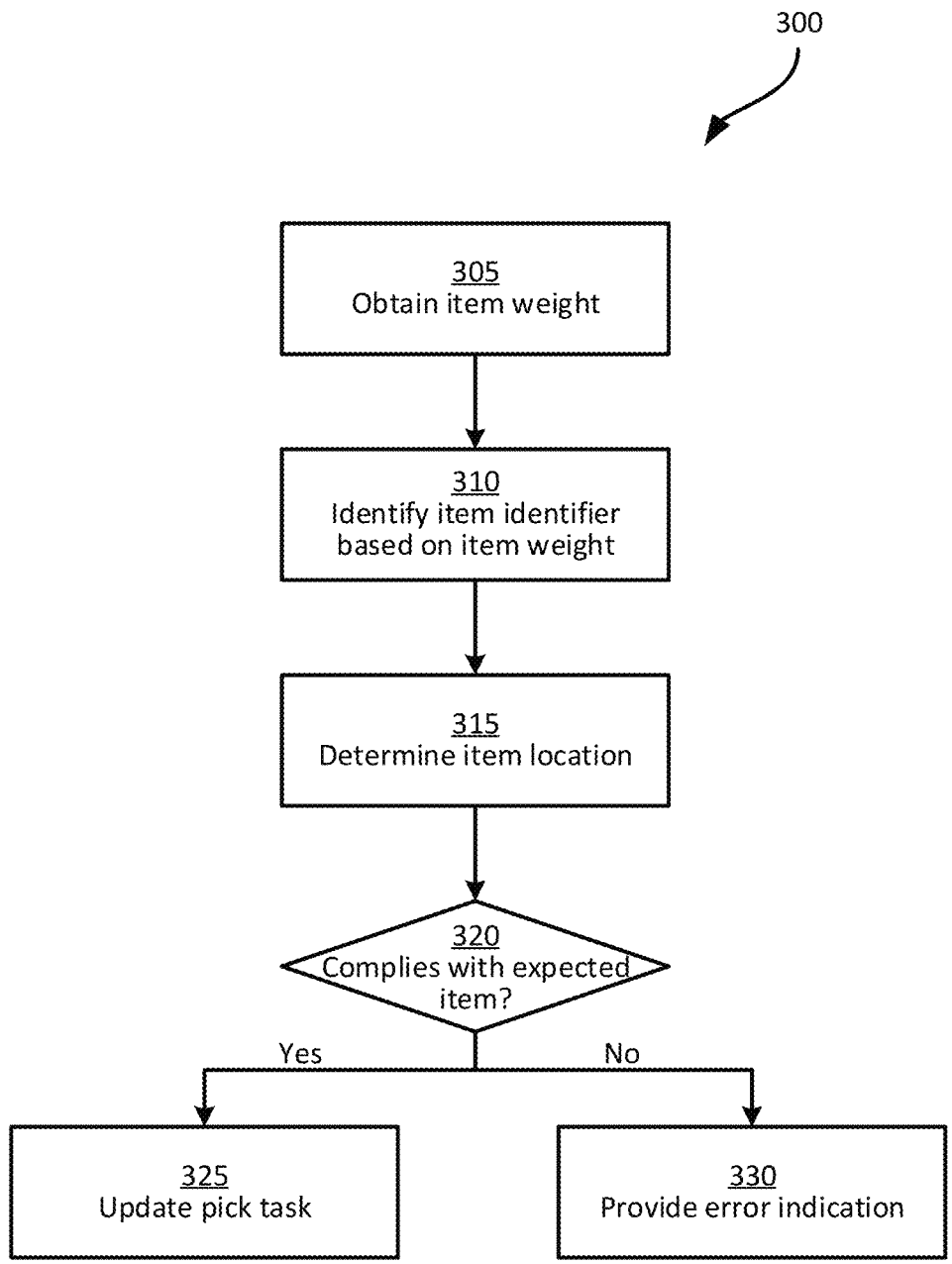
FIG. 3 is a flowchart of a method of weight-based item detection and verification.

Turning now to FIG. 3, the functionality implemented by the transporter 130 will be discussed in greater detail. FIG. 3 illustrates a method 300 of weight-based item detection. The method 300 will be discussed in conjunction with its performance in the system 100, and particularly by the transporter 130, via execution of the application 176. In particular, the method 300 will be described with reference to the components of FIGS. 1 and 2. In other examples, the method 300 may be performed by other suitable devices or systems, such as the server 134.

The method 300 is initiated at block 305, where the processor 160 obtains an item weight from one of the weight sensing systems 216. In some examples, the processor 160 may specifically control the weight sensing systems 216 to activate based on the navigation and movement of the transporter 130.

For example, in response to receiving navigational instructions, the transporter 130 may navigate to the specified location. Responsive to the transporter 130 arriving at its target destination, the processor 160 may activate the weight sensing systems 216. For example, the processor 160 may determine that the transporter 130 has arrived at its target destination when its location matches the target destination, when the IMU or other sensors detect that the transporter 130 is stationary, combinations of the above, and the like. The processor 160 may then record a current weight detected by each of the weight sensing systems 216. The current weight may subsequently be used as a reference against which to compare any change in weight in order to detect that an item was received on one of the shelves 208. In some examples, the current weight may additionally be compared to a prior weight to verify that no items were lost in transit.

The processor 160 may then control each of the weight sensing systems 216 to monitor for any changes in weight. When one of the weight sensing systems 216 detects a change in weight, the processor 160 obtains a new weight detected by the weight sensing system 216 and computes the item weight as the difference between the new weight and the current weight.

At block 310, the processor 160 identifies an item identifier for the item 108 based on the item weight obtained at block 305. The processor 160 may determine the item identifier by comparing the item weight to a list of predefined item weights of items in the facility and identifying a correspondence between the item weight detected at block 305 and one of the predefined item weights on the list.

Figure 4:
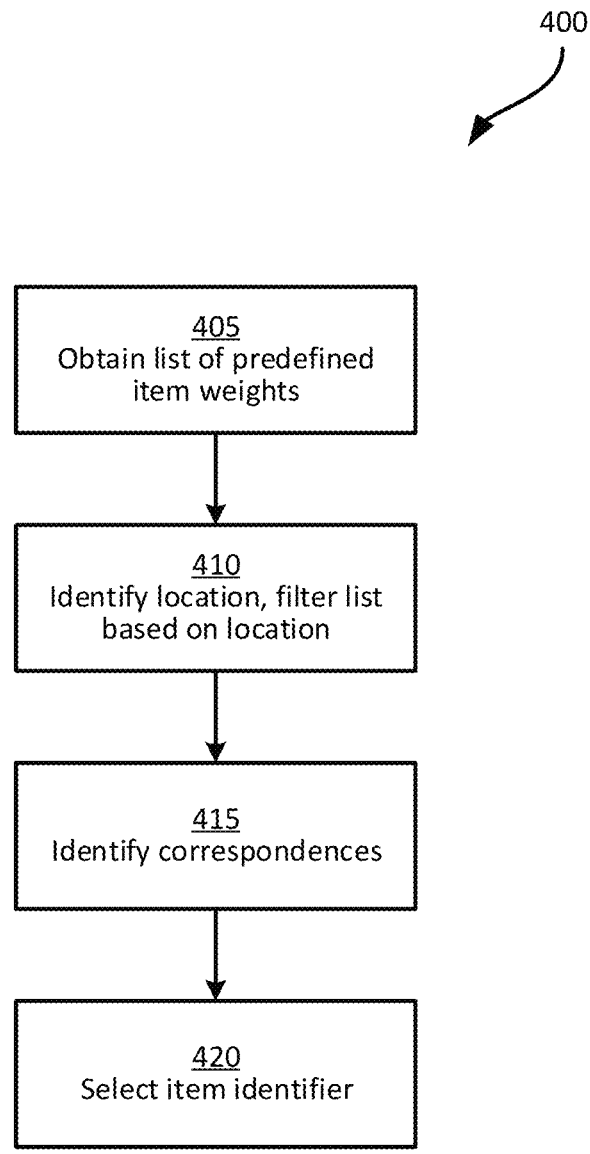
FIG. 4 is a flowchart of an example method of identifying an item identifier based on item weight at block 310 of the method of FIG. 3.

For example, referring to FIG. 4, an example method 400 of identifying the item identifier at block 310 is depicted.

At block 405, the processor 160 obtains a list of predefined item weights of items in the facility. The list may include associations of item identifiers to item weights. The item weights may include an average weight, a range of item weights for the particular item, or another suitable representation of the item weight. The list of predefined item weights may be stored in the repository 180 in the memory 164, and hence the processor 160 may retrieve the list from the memory 164. In other examples, such as for a large facility having a large repository of predefined item weights, the list of predefined item weights may be stored in the memory 154 of the server 134, and hence the processor 160 may request the list of predefined item weights from the server 134.

At block 410, the processor 160 may identify a location of the transporter 130, for example, by using data obtained from the navigator 172 and/or the location tracking subsystem. The processor 160 may then filter the list based on the location of the transporter 130. Each item 108 on the list may also be associated with a location within the facility at which the item 108 is stored on a support structure 104. Since the transporter 130 may be expected to be nearby to the location of an item deposited to the transporter 130, the list may be filtered to items 108 stored on support structures 104 within a threshold distance of the transporter 130. The threshold distance may be defined, for example, based on a walking distance of the user 128 from the storage location of the item 108 on the support structures 104 to the location of the transporter 130. Hence, items in adjacent aisles may not be within the threshold distance of the transporter 130.

Further, as will be appreciated, in some examples, rather than requesting the full list of predefined item weights from the server 134 at block 405, the processor 160 may first identify the location of the transporter 130 and request a list from the server 134 which is filtered based on the location of the transporter 130.

At block 415, the processor 160 identifies correspondences between the item weight obtained at block 305 and the list of predefined item weights. For example, the processor 160 may look for a direct match between the item weight and one of the predefined item weights on the list. That is, if the item weight is within a threshold similarity (e.g., 5%, 1%, etc.) to one of the predefined item weights on the list, the processor 160 may determine that the measured item weight corresponds to that predefined item weight.

In other examples, rather than a direct match between the item weight and one of the predefined item weights on the list, the item weight may be an integer multiple of one of the predefined item weights on the list. For example, if five of the items 108 were transferred to the transporter 130 in accordance with the order, then the item weight of the five items 108 will be five times that of the predefined item weight for the item 108 stored in the list. Accordingly, if the item weight is within a threshold similarity of an integer multiple of one of the predefined item weights on the list, the processor 160 may determine that the measured item weight corresponds to that predefined item weight.

As will be appreciated, multiple items in the facility may have similar item weights, and hence the item weight may correspond to more than one predefined item weight on the list. Accordingly, the facility may be organized such that items within a threshold radius have sufficiently different item weights to be differentiated from one another (e.g., items within a threshold radius may have item weights which differ by at least 10% or 30%, etc.). The threshold radius may be determined based on the threshold distance used to filter the list of predefined item weights, such that the filtered list of predefined item weights contains item weights which can be easily differentiated from one another. That is, the organization of the facility to distribute items with different item weights may reduce the likeliness that the processor 160 identifies more than one item weight from the filtered list of predefined item weights which correspond to a measured item weight from a performance of block 305.

At block 420, the processor 160 selects an item identifier for the item 108 based on at least one of the correspondences identified at block 415. If the processor 160 identifies exactly one predefined item weight which corresponds to the item weight obtained at block 305, then the processor 160 selects the corresponding item identifier for the predefined item weight.

If the processor 160 identifies more than one correspondence at block 415 of the predefined item weights to the item weight obtained at block 305, then the processor 160 may apply additional conditions to select one of the correspondences. For example, the processor 160 may select the predefined item weight which most closely corresponds to the measured item weight. The processor 160 may then select the corresponding item identifier for the selected predefined item weight. In other examples, rather than selecting a single item identifier, the processor 160 may record each of the item identifiers for the correspondences identified at block 415 and may carry them forwards to be verified against an expected item for the transporter 130, as will be described in further detail below.

Returning to FIG. 3, at block 315 the processor 160 may optionally determine the item location relative to the shelf 208 based on a distribution of the item weight on the weight sensing system 216. In some examples, the processor 160 may proceed directly to block 320.

In the presently illustrated example, the weight sensing system 216 includes the four weight sensors 220. Each of the four weight sensors 220 is disposed at a corner of the respective shelf 208. Accordingly, the ratio of the item weight detected by the two weight sensors 220 corresponding to a first edge to the item weight detected by the two weight sensors 220 corresponding to a second edge opposing the first edge will correspond to the ratio of the distance of the center of mass of the item 108 between the two edges.

Figure 5:
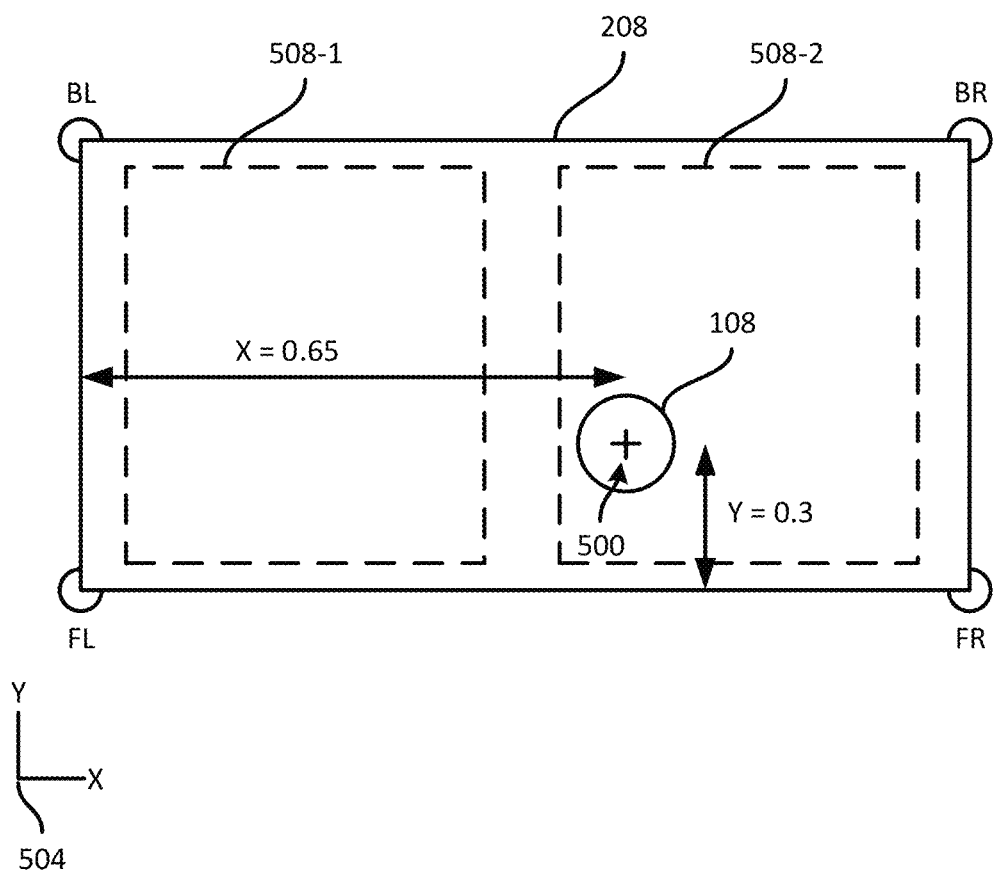
FIG. 5 is a schematic diagram of a performance of block 315 of the method of FIG. 3.

For example, referring to FIG. 5, a schematic diagram of the weight distribution of an item 108 is depicted. In particular, the item 108 having an item location 500 is on the shelf 208. The shelf 208 has associated weight sensors 220 which are located at a back left (BL), a back right (BR), a front left (FL) and a front right (FR) corner of the shelf 208. Also depicted is a coordinate system 504 for the shelf 208. The BL, BR, FL, and FR weight sensors 220 detect, respectively weights of 2 g, 4 g, 5 g, and 9 g, and hence the weight sensing system 216 may determine that the item weight is 20 g (i.e., the sum of the weights detected by the four weight sensors 220).

The item location 500 may be represented by x- and y-coordinates of the center of mass of the item 108, as represented in the coordinate system 504.

In order to determine the y-coordinate along the y-scale of the center of mass of the item 108, the processor 160 computes the ratio of the weights detected by the back sensors to the total item weight, in accordance with equation (1):

$$y = \frac{m_{BL} + m_{BR}}{m_{FL} + m_{FR} + m_{BL} + m_{BR}} \quad (1)$$

Similarly, to determine the x-coordinate along the x-scale of the center of mass of the item 108, the processor 160 computes the ratio of the weights detected by the right sensors to the total item weight, in accordance with equation (2):

$$x = \frac{m_{BR} + m_{FR}}{m_{BL} + m_{FL} + m_{BR} + m_{FR}} \quad (2)$$

Accordingly, in the illustrated example, the y-coordinate position of the center of mass of the item 108 is 0.3 of the way along the y-scale and the x-coordinate position of the center of mass of the item 108 is 0.65 of the way along the x-scale. Together, these positions define the item location 500.

In examples where the transporter 130 includes bins 212 on each of the shelves 208, identifying the item location 500 at block 315 may additionally include identifying one of the bins 212 in which the item 108 was received based on the item location. For example, in the present example the coverage areas 508-1 and 508-2 of two of the bins 212 are outlined on the shelf 208. Since the item location 500 is located in the coverage area 508-2 of the right bin 212, the right bin 212 may be identified as the bin 212 containing the item 108.

In other examples, the weight sensing systems 216 may have other configurations, such as a combination of a capacitive mat and a simple scale, which may enable the weight sensing system 216 to determine the item location in other manners.

Returning to FIG. 3, at block 320, the processor 160 determines whether the item identifier identified at block 310 complies with an expected item to be received at the transporter 130. The expected item may be based on data received from the server 134, for example based on a recently scanned barcode, or based on the location of the transporter 130. The expected item may also be based at least in part on the item location determined at block 315.

For example, when the processor 160 determines that the item 108 has been deposited in a particular bin 212, the processor 160 may retrieve, from the memory 164 and/or from the server 134, a list of expected items for the identified bin 212. The list of expected items for the identified bin 212 may correspond to items which are all to be transported or delivered as part of the same order. The processor 160 may then compare the item identifier from block 310 to the list of expected items and verify that the item is on the list of expected items. If the item identifier is on the list of expected items for the identified bin 212, the processor 160 determines at block 320 that the item complies with the expected item to be received at the transporter 130.

Further, comparing the item identifier to the list of expected items for the bin 212 may additionally include verifying that the item weight complies with an expected item weight to verify that the correct quantity of expected items has been received at the transporter 130. For example, if the list of expected items specifies that three of a given item 108 are expected, the processor 160 may still identify the correct item identifier corresponding to the given item 108. However, if only one of the given items 108 is received by the transporter 130, the item weight (i.e., approximately the predefined item weight for the given item 108) may not correspond to the expected weight (i.e., approximately three times the predefined item weight for the given item 108.

Similarly, verifying that the item weight complies with an expected item weight may also be used to verify that the correct package size of the expected items has been received at the transporter 130. For example, the pick task may specify that a paperclip is to be picked and deposited on the transporter 130. However, the user 128 may be unsure if a single paperclip, a package of paperclips, or a box of packages of paperclips is to be transferred to the transporter 130. Accordingly, the processor 160 may still identify the correct item identifier for the paperclip, and the item weight may be used to verify that the correct package size of paperclips was received on the transporter.

In another example, to determine whether the item complies with the expected item, the processor 160 may cross-reference the item identifier with a recently scanned item. In particular, the processor 160 may request and obtain, from the server 134, a scanned item identifier of an item 108 recently scanned by a user 128. For example, the server 134 may select the scanned item identifier which was scanned by the mobile device 132 paired with the transporter 130 for a pick task. That is, the server 134 may identify the mobile device 132 which was assigned to pick an item to transfer to the transporter 130 and retrieve the item identifier which was most recently scanned by the mobile device 132.

In other examples, the server 134 may select the scanned item identifier, based on the location of the transporter 130 and the time of the request. That is, the server 134 may identify scanning events which occurred within a threshold distance of the location of the transporter 130, and which were scanned within a threshold interval (e.g., 1 minute, 90 seconds, 2 minutes, etc.) of the transporter 130 detecting an item 108 being deposited thereon. If the item identifier matches the scanned item identifier, the processor 160 determines at block 320 that the item complies with the expected item to be received at the transporter 130.

In yet another example, to determine whether the item complies with the expected item, the processor 160 may obtain a target item identifier. That is, based on the location of the transporter 130, the processor 160 may identify one or more items 108 which are stored on support structures 104 within a threshold distance of the transporter 130. These items 108 may be identified as target items which the transporter 130 expects to receive while at its specified location. Accordingly, if the item identifier matches the one of the target item identifiers, then the processor 160 determines at block 320 that the item complies with the expected item to be received at the transporter 130.

As will be apparent, combinations of the above and additional manners of determining whether the item complies with the expected item are also possible and contemplated. For example, if the processor 160 has identified multiple item identifiers whose predefined item weights correspond with the item weight measured at block 305, then the processor 160 may use the expected item to assist in the selection of the item identifier. That is, the processor 160 may assume that the correct item identifier of the multiple potential item identifiers is the one which allows for a positive determination of compliance with the expected item.

If the determination at block 320 is affirmative, that is that the item identifier complies with the expected item to be received at the transporter 130, then the processor 160 proceeds to block 325. At block 325, the processor 160 may provide an update on the pick task to the server 134. For example, the processor 160 may identify that a particular pick task has been successfully completed (i.e., that item 108 identified by the specified pick task has been successfully received at the transporter 130). In some examples, the processor 160 may control an output device of the transporter 130 to provide an output indicative of the successful completion of the pick task. For example, the processor 160 may control a display to flash a green light and/or text indicating success, or a speaker to confirm the item 108 was received.

In some examples, in addition to confirming the item 108 was received, the processor 160 may additionally store and/or transmit the item weight obtained at block 305 to the server 134 to track actual detected item weights for the items 108. The repository of predefined item weights may then be adjusted based on the actual detected item weights to more accurately reflect the item weights.

In some examples, the processor 160 may additionally store the item weight in the memory 164 and update a total or aggregate item weight for the items currently being held by the transporter 130, and a total lifetime carrying weight for the transporter 130. The navigator 172 may then use the aggregate item weight and the distribution of the item weight during navigation, for example to adjust acceleration, predicted run time, or the like. For example, if much of the item weight is distributed on the top shelf 208-1, the navigator 172 may reduce the rates of acceleration and deceleration to better balance the top-heavy transporter 130. The processor 160 may additionally use the total lifetime carrying weight for the transporter 130 to estimate servicing requirements. Other prescriptive actions which may be performed by the navigator 172 and the processor 160 will also be apparent.

If the determination at block 320 is negative, that is that the item identifier does not comply with the expected item to be received at the transporter 130, then the processor 160 proceeds to block 330. At block 330, the processor 160 may control an output device of the transporter 130 to provide an error indication. For example, the processor 160 may control a display to flash a red light and/or text indicating that an error condition was detected, and/or a speaker to beep or otherwise issue a warning indicator. In other examples, the processor 160 may send a message to the mobile device 132 (via the communications interface 168 or the server 134) to alert the user 128 that an incorrect item was received and/or that the item was placed in the incorrect bin or location on the transporter 130.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. For example, the transporter is described in the present example as being an autonomous or semi-autonomous transporter. However, in other examples, a pushcart or other manually driven transporter may be equipped with the described weight sensing system, communications interface, and/or processor and may similarly determine whether the items received on the transporter comply with expected items and provide feedback to the user.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A transporter comprising:
   a chassis with a locomotive assembly;
   a shelf supported on the chassis, the shelf configured to receive items;
   a weight sensing system associated with the shelf, the weight sensing system configured to measure an item weight for an item received on the shelf;
   a processor interconnected with the weight sensing system, the processor configured to:
      obtain, from the weight sensing system, the item weight;
      identify an item identifier for the item based on the item weight; and
      determine, based on the item identifier, whether the item complies with an expected item to be received at the transporter.

2. The transporter of claim 1, wherein the weight sensing system is further configured to determine an item location on the shelf for the item, based on a distribution of the item weight on the weight sensing system.

3. The transporter of claim 2, wherein the weight sensing system comprises four weight sensors, each weight sensor disposed at a corner of the shelf.

4. The transporter of claim 2, wherein the shelf comprises a plurality of bins, and wherein the processor is further configured to identify a bin of the plurality of bins, in which the item was received, based on the item location.

5. The transporter of claim 4, wherein, to determine whether the item complies with the expected item, the processor is configured to:
   obtain, based on the identified bin, a list of expected items for the identified bin; and
   verify that the item identifier is on the list of expected items.

6. The transporter of claim 1, wherein, to identify the item identifier for the item, the processor is configured to:
   obtain a list of predefined item weights of items in a facility; and
   select the item identifier based on a correspondence between the item weight and one of the predefined item weights on the list.

7. The transporter of claim 6, wherein the item weight is an integer multiple of one of the predefined item weights on the list.

8. The transporter of claim 6, wherein the processor is further configured to filter the list of predefined item weights, based on a location of the transporter, prior to selecting the item identifier.

9. The transporter of claim 1, wherein, to determine whether the item complies with the expected item, the processor is configured to:
   obtain a scanned item identifier of an item scanned by a user; and
   verify that the item identifier matches the scanned item identifier.

10. The transporter of claim 1, wherein, to determine whether the item complies with the expected item, the processor is configured to:
   obtain a target item identifier of a target item for the transporter based on a location of the transporter; and
   verify that the item identifier matches the target item identifier.

11. The transporter of claim 1, wherein, to determine whether the item complies with the expected item, the processor is further configured to verify that the item weight complies with an expected item weight.

12. The transporter of claim 1, wherein, when the item does not comply with the expected item, the processor is configured to provide an error indication.

13. A method comprising:
   obtaining, from a weight sensing system of a transporter, an item weight for an item received on a shelf of the transporter;
   identifying an item identifier for the item based on the item weight; and
   determining, based on the item identifier, whether the item complies with an expected item to be received at the transporter.

14. The method of claim 13, further comprising: determining an item location on the shelf for the item, based on a distribution of the item weight on the weight sensing system.

15. The method of claim 14, further comprising identifying a bin of a plurality of bins of the shelf into which the item was received, based on the item location.

16. The method of claim 15, wherein determining whether the item complies with the expected item comprises:
   obtaining, based on the identified bin, a list of expected items for the identified bin; and
   verifying that the item identifier is on the list of expected items.

17. The method of claim 13, wherein identifying the item identifier for the item comprises:
   obtaining a list of predefined item weights of items in a facility; and
   selecting the item identifier based on a correspondence between the item weight and one of the predefined item weights on the list.

18. The method of claim 17, wherein the item weight is an integer multiple of one of the predefined item weights on the list.

19. The method of claim 17, further comprising filtering the list of predefined item weights, based on a location of the transporter, prior to selecting the item identifier.

20. The method of claim 13, wherein determining whether the item complies with the expected item comprises:
   obtaining a scanned item identifier of an item scanned by a user; and
   verifying that the item identifier matches the scanned item identifier.

21. The method of claim 13, wherein determining whether the item complies with the expected item comprises:
   obtaining a target item identifier of a target item for the transporter based on a location of the transporter; and verifying that the item identifier matches the target item identifier.

22. The method of claim 13, wherein determining whether the item complies with the expected item comprises verifying that the item weight complies with an expected item weight.

23. The method of claim 13, further comprising, when the item does not comply with the expected item, providing an error indication.

\* \* \* \* \*